United States Patent
Smith et al.

(10) Patent No.: US 8,619,192 B2
(45) Date of Patent: Dec. 31, 2013

(54) CLOSED CAPTIONING PREFERENCES

(75) Inventors: Michael Victor Smith, Fremont, CA (US); Andrew W. Walters, San Jose, CA (US); Vyacheslav Gurevich, Mountain View, CA (US)

(73) Assignee: Microsoft Corporation, Redmond, WA (US)

( * ) Notice: Subject to any disclaimer, the term of this patent is extended or adjusted under 35 U.S.C. 154(b) by 1336 days.

(21) Appl. No.: 11/820,941

(22) Filed: Jun. 21, 2007

(65) Prior Publication Data

US 2010/0020234 A1 Jan. 28, 2010

(51) Int. Cl.
*H04N 11/00* (2006.01)
*H04N 7/08* (2006.01)

(52) U.S. Cl.
USPC ........... 348/468; 348/461; 348/465; 348/467; 725/137

(58) Field of Classification Search
None
See application file for complete search history.

(56) References Cited

U.S. PATENT DOCUMENTS

| | | | |
|---|---|---|---|
| 6,373,526 B1 * | 4/2002 | Kessler et al. | 348/468 |
| 7,184,094 B2 * | 2/2007 | Mathew et al. | 348/453 |
| 7,184,095 B2 | 2/2007 | Katayama | |
| 7,701,511 B2 * | 4/2010 | Kurose et al. | 348/468 |
| 8,479,238 B2 * | 7/2013 | Chen et al. | 725/86 |
| 2002/0122136 A1 * | 9/2002 | Safadi et al. | 348/465 |
| 2004/0237123 A1 * | 11/2004 | Park | 725/131 |
| 2004/0252234 A1 | 12/2004 | Park | |
| 2005/0162551 A1 * | 7/2005 | Baker | 348/468 |
| 2006/0017845 A1 * | 1/2006 | Onomatsu et al. | 348/468 |
| 2006/0098641 A1 | 5/2006 | Lee et al. | |
| 2006/0232705 A1 * | 10/2006 | Kurose et al. | 348/465 |
| 2007/0076122 A1 * | 4/2007 | Modi et al. | 348/465 |
| 2007/0180460 A1 * | 8/2007 | Park | 348/468 |
| 2009/0244373 A1 * | 10/2009 | Park | 348/468 |

FOREIGN PATENT DOCUMENTS

WO 2006089022 A1 8/2006

OTHER PUBLICATIONS

"Closed Caption Encoder/Decoder for both Digital & Analog, NTSC & PAL (Model PDA-895)" http://www.edgemontvideo.com/store/index.php?p=product&id=726&parent=93.
"VBI Bridging of Closed Caption Data", Date: Jun. 26, 2001.

* cited by examiner

*Primary Examiner* — Brian Pendleton
*Assistant Examiner* — Dika C. Okeke
(74) *Attorney, Agent, or Firm* — Wolfe-SBMC

(57) ABSTRACT

Techniques are described to provide closed captioning preferences. In an implementation, a user interface is output that is configured to accept preferences for a plurality of closed captions. A first one of the closed captions is output, based on the preferences, when available via a particular channel. A second one of the closed captions is output, based on the preferences, when the first closed caption is not available via the particular channel.

18 Claims, 7 Drawing Sheets

CLOSED CAPTIONING PREFERENCES

BACKGROUND

Closed captioning is typically used to provide a textual representation of spoken audio in content. For example, closed captioning may be displayed on a display device to help the hearing impaired consume content, such as to watch a television program. Closed captioning is considered "closed" due to the ability to display the closed captioning when desired, whereas "open" captions are incorporated and displayed as a permanent part of the content.

Traditional closed captioning was provided as a part of the content itself, such as through inclusion in a video blanking interval (VBI). To cause output of the traditional closed captioning, the user was given an option of whether to display the closed captioning data available from the VBI. This option was then applied to each of the channels viewed by the user. However, techniques were subsequently developed to provide a variety of closed captioning options. Therefore, these techniques also included a feature to let a user choose particular closed captioning (e.g., in a particular language) for output from the variety of closed captions. However, these traditional techniques limited output to the particular closed caption. Therefore, if this closed captioning chosen was not available, a closed caption was not output, regardless of the availability of other closed captions.

SUMMARY

Techniques are described to provide closed captioning preferences. In an implementation, a user interface is output that is configured to accept preferences for a plurality of closed captions. A first one of the closed captions is output, based on the preferences, when available via a particular channel. A second one of the closed captions is output, based on the preferences, when the first closed caption is not available via the particular channel.

In another implementation, a client includes a processor and memory configured to maintain a module that is executable on the processor to automatically switch without user intervention from a preferred closed caption to another closed caption when the preferred closed caption is not available.

In a further implementation, one or more computer-readable media comprise executable instructions that are executable to output a user interface configured to receive inputs that specify preferences for digital and analog closed captions to be displayed with content.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Figure 1:
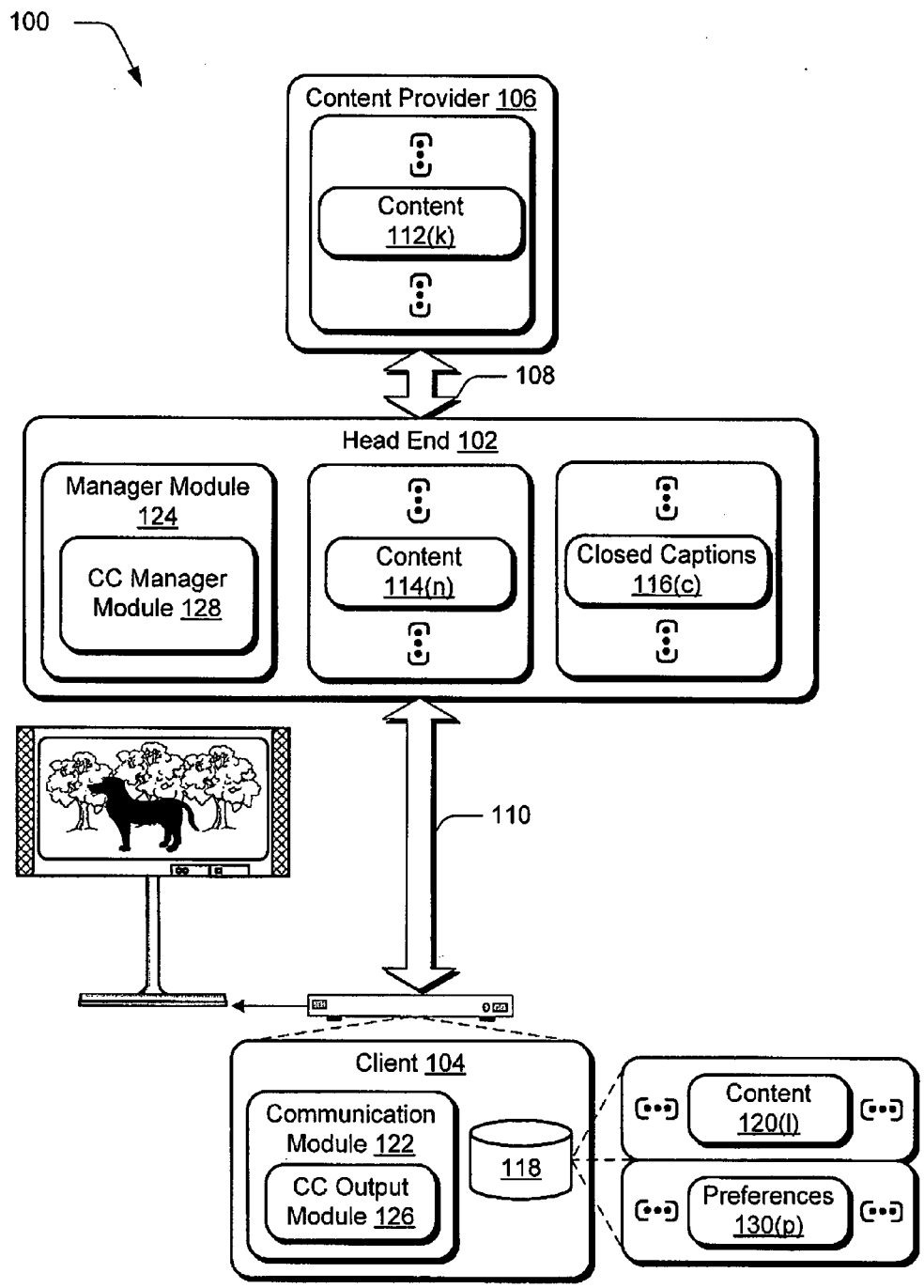
FIG. 1 is an illustration of an environment in an exemplary implementation that is operable to provide closed captioning preferences.

Closed-captions may be used to provide a textual description of audio in a television program, such as spoken words as well as brief descriptions of other sounds that are also typically heard in the corresponding television program, e.g., a notification of the sound of a breaking glass. Accordingly, closed captioning may be used to provide a variety of different functionality, such as an aid to hearing impaired, to assist content consumption in a noisy environment, and so on.

Traditional techniques that were employed to provide closed captioning included the closed caption as a part of the content through inclusion in a video blanking interval (VBI) in what is sometimes referred to as an "analog closed caption". It should be noted that analog closed captions may also be communicated digitally and thus "analog" is not limiting on a form of communication used to transmit the analog closed captions. As content communication techniques continued to evolve, "digital closed captions" were developed which permitted transmission of the closed captions in a stream separate from a stream used to transmit corresponding content, such as a television program, although the streams are transmitted together in a transport stream. For example, the digital closed caption may be embedded in the content (e.g., within user data of a video elementary stream) such that it is provided as a separate stream but not "out-of-band". A variety of other examples are also contemplated. Traditional techniques, however, were not configured to address situations having multiple types of closed captioning.

Accordingly, techniques are described to provide closed captioning preferences. In an implementation, a user interface is provided which is configured to allow a user to select between options for a plurality of closed captioning. These preferences may then be used in a variety of ways to improve user interaction with closed captions. For example, the user may specify preferences for particular closed captions (e.g., a hierarchy) such that when a preferred closed caption is not available, another closed caption is output.

The user, for instance, may specify a preference for a particular one of a plurality of digital closed captions and a preference for a particular one of a plurality of analog closed captions. Therefore, when the preferred digital closed caption is not available, the analog closed caption may be output automatically and without user intervention. In an implementation, the "switch" between the closed captions may be performed such that the user is not aware that a switch has occurred. Although switching between digital and analog closed captions has been described in this example, other switches are also contemplated. Further discussion of switching between closed captions may be found in relation to the following figures.

In the following discussion, an exemplary environment is first described that is operable to perform techniques to provide and utilize closed captioning preferences. Exemplary user interfaces and procedures are then described that may be employed in the exemplary environment, as well as in other environments. Although these techniques are described as employed within a television environment in the following discussion, it should be readily apparent that these techniques may be incorporated within a variety of environments without departing from the spirit and scope thereof.

Exemplary Environment

FIG. 1 is an illustration of an environment 100 in an exemplary implementation that is operable to employ closed captioning preferences. The illustrated environment 100 includes a head end 102 of a network operator, a client 104 and a content provider 106 that are communicatively coupled, one to another, via network connections 108-110. In the following discussion, the head end 102, the client 104 and the content provider 106 may be representative of one or more entities, and therefore reference may be made to a single entity (e.g., the client 104) or multiple entities (e.g., the clients 104, the plurality of clients 104, and so on). Additionally, although a plurality of network connections 108-110 are shown separately, the network connections 108-110 may be representative of network connections achieved using a single network or multiple networks. For example, network connection 110 may be representative of a broadcast network with back channel communication, an Internet Protocol (IP) network, a network capable of supporting multiple simultaneous streams wrapped in a transport stream, and so on.

The client 104 may be configured in a variety of ways. For example, the client 104 may be configured as a computer that is capable of communicating over the network connection 110, such as a desktop computer, a mobile station, an entertainment appliance, a set-top box communicatively coupled to a display device as illustrated, a wireless phone, and so forth. For purposes of the following discussion, the client 104 may also relate to a person and/or entity that operate the client. In other words, client 104 may describe a logical client that includes a user, software and/or a machine.

The content provider 106 includes one or more items of content 112(k), where "k" can be any integer from 1 to "K". The content 112(k) may include a variety of data, such as television programming, video-on-demand (VOD) files, one or more results of remote application processing, and so on. The content 112(k) is communicated over the network connection 108 to the head end 102.

Content 112(k) communicated via the network connection 110 is received by the head end 102 and may be stored as one or more items of content 114(n), where "n" can be any integer from "1" to "N". The content 114(n) may be the same as or different from the content 112(k) received from the content provider 106. The content 114(n), for instance, may include additional data for broadcast to the client 104. For example, the content 114(n) may include electronic program guide (EPG) data from an EPG database for broadcast to the client 104 utilizing a carousel file system. The carousel file system repeatedly broadcasts the EPG data over an out-of-band (OOB) channel to the client 104 over the network connection 110. Distribution from the head end 102 to the client 104 may be accommodated in a number of ways, including cable, radio frequency (RF), microwave, digital subscriber line (DSL), and satellite.

The content 114(n) may also be associated with closed captions 116(c), where "c" can be any integer from one to "C". As previously described, closed captions 116(c) may be configured in a variety of ways, such as a textual representation of spoken audio and other sounds in content, such as a television program. For example, the closed captions 116(c) may provide a textual description of audio in a television program, such as spoken words as well as brief descriptions of other sounds that are also typically heard in the corresponding television program, e.g., a notification of the sound of a breaking glass. Closed captions 116(c) may also be used with foreign languages, such as to provide a translation from one language to another. The head end 102 may provide the closed captions 116(c) to the client 104 in a variety of ways, such as through streaming "with" the content 114(n) over the network connection 110 (e.g., as "analog" closed captions) or in a separate stream (e.g., as "digital" closed captions), further discussion of which may be found in relation to FIG. 2.

The client 104, as previously stated, may be configured in a variety of ways to receive the content 114(n) over the network connection 110. The client 104 typically includes hardware and software to transport and decrypt content 114(n) received from the head end 102 for rendering by the illustrated display device. Although a display device is shown, a variety of other output devices are also contemplated, such as speakers.

The client 104 may also include digital video recorder (DVR) functionality. For instance, the client 104 may include a storage device 118 to record content 114(n) as content 120(l) (where "l" can be any integer from one to "L") received via the network connection 110 for output to and rendering by the display device. Thus, content 120(l) that is stored in the storage device 118 of the client 104 may be copies of the content 114(n) that was streamed from the head end 102. Additionally, content 120(l) may be obtained from a variety of other sources, such as from a computer-readable medium that is accessed by the client 104, and so on. Further, the content 120(l) may also include closed captions, which may be the same as or different from closed captions 116(c) (e.g., digital or analog).

The client 104 includes a communication module 122 that is executable on the client 104 to control content playback on the client 104, such as through the use of one or more "command modes". The command modes may provide non-linear playback of the content 120(l) (i.e., time shift the playback of the content 120(l)) such as pause, rewind, fast forward, slow motion playback, and the like.

The head end 102 is illustrated as including a manager module 124. The manager module 124 is representative of functionality to configure content 114(n) for output (e.g., streaming) over the network connection 110 to the client 104. The manager module 124, for instance, may configure content 112(k) received from the content provider 106 to be suitable for transmission over the network connection 110, such as to "packetize" the content for distribution over the Internet, configuration for a particular broadcast channel, map the content 112(k) to particular channels, and so on.

Thus, in the environment 100 of FIG. 1, the content provider 106 may broadcast the content 112(k) over a network connection 108 to a multiplicity of network operators, an example of which is illustrated as head end 102. The head end 102 may then stream the content 114(n) over a network connection 110 to a multitude of clients, an example of which is illustrated as client 104. The client 104 may then store the content 114(*n*) in the storage device 118 as content 120(*l*), such as when the client 104 is configured to include digital video recorder (DVR) functionality.

The client 104 is further illustrated as including a closed captioning (CC) output module 126. The CC output module 126 is representative of functionality that may be employed by the client 104 to interact with the closed captions 116(*c*) that correspond with the content 114(*n*) available remotely over the network connection 110 and/or available locally as associated with content 120(*l*). The CC output module 136, for instance, may be executable to request certain closed captions 116(*c*) through interaction with a CC manager module 128 of the head end 102, locate particular streams of closed captions 116(*c*), decode closed captions 116(*c*) from a video blanking interval (VBI), and so on.

The CC output module 126 is also representative of functionality that may be used to specify, store and/or apply preferences 130(*p*) (where "p" can be any integer from one to "P") to closed captions, such as closed captions 116(*c*) from the head end 102, closed captions associated with the content 120(*l*) local to the client 104, and so on. A variety of different preferences 130(*p*) may be specified for closed captioning, such as which closed captioning should be output, what should be done when preferred closed captioning is not available, and so on, further discussion of which may be found in relation to the following figure.

It should be noted that one or more of the entities shown in FIG. 1 may be further divided (e.g., the head end 102 may be implemented by a plurality of servers in a distributed computing system), combined, and so on and thus the environment 100 of FIG. 1 is illustrative of one of a plurality of different environments that may employ the described techniques. Additionally, although the preferences 130(*p*) are illustrated as being stored on the client 104, the preferences may be stored throughout the environment without departing from the spirit and scope thereof. For example, the preferences 130(*p*) may be stored at the head end 102 and applied at the head end 102. In another example, the preferences 130(*p*) may be stored at the head end 102 and provided to the client 104 when desired through use of a "client store", such as due to data loss, changing from one client to another, and so on.

Figure 2:
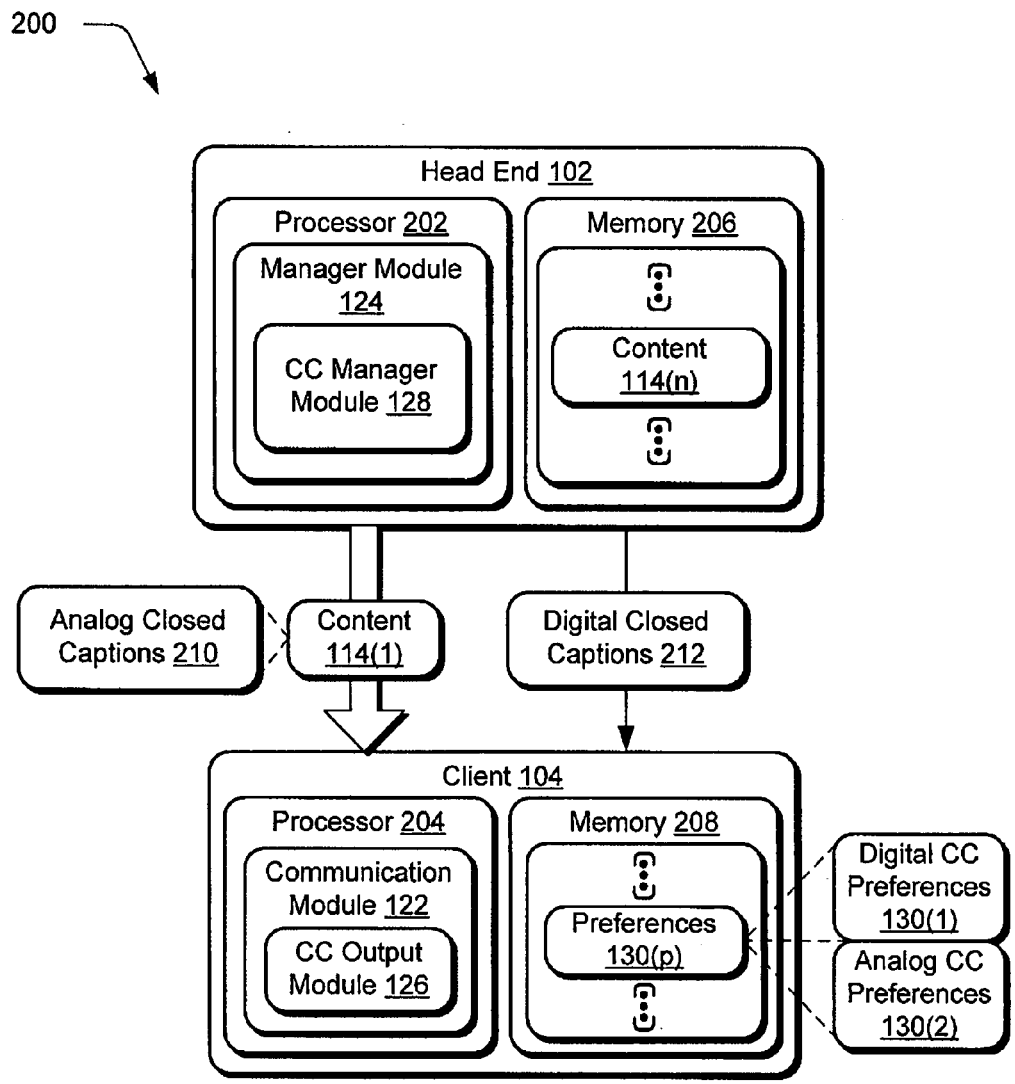
FIG. 2 is an illustration of a system showing a head end and a client of FIG. 1 in greater detail.

FIG. 2 depicts a system 200 in an exemplary implementation showing the head end 102 and the client 104 in greater detail. The head end 102 and the client 104 are both illustrated as devices having respective processors 202, 204 and memory 206, 208. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 206, 208 is shown, respectively, for the head end 102 and the client 104, a wide variety of types and combinations of memory may be employed, such as random access memory (RAM), hard disk memory, removable medium memory, and other types of computer-readable media.

The functionality of applying preferences 130(*p*) to closed captions may be distributed in the environment 100 of FIG. 1 in a variety of ways. For example, the head end 102 may execute the CC manager module 128 on the processor 202, which is storable in memory 206, to stream content 114(*n*) to the client 104, an example of which is shown as content 114(*l*). The content 114(*l*) is illustrated in this example as including analog closed captions 210 that are included "within" the content 114(*l*). For example, the analog closed captions 210 may be communicated via a video blanking interval (VBI) of the content. A variety of other examples are also contemplated.

As previously described, the use of the term "analog closed captions" 210 does not limit communication of the closed captions to analog techniques, as digital techniques (e.g., Internet Protocol) may be used to communicate the content 114(*l*) and consequently the analog closed captions 210. In an implementation, the analog closed captions 210 are configured in accordance with Electronic Industries Alliance 608 (EIA-608) standard for closed captioning.

The CC manager module 128 may also be used to provide digital closed captions 212. In the system 200 of FIG. 2, the digital closed captions 212 are illustrated as being streamed separately from the content 114(*l*) to the client 104 and thus are not streamed "within" the content 114(*l*) (e.g., the VBI) as described for the analog closed captions 210 in this example. The digital closed captions 212 may be configured in a variety of ways, such as in accordance with Electronic Industries Alliance 708 (EIA-708) standard for closed captioning.

The client 104 is illustrated as executing the communication module 122 on the processor 204, which is also storable in memory 208. The communication module 122 may be executed to provide a variety of functionality to receive and manage the content 114(*l*), such as to process content 114(*l*) for rendering on a display device. A variety of other examples are also contemplated.

The communication module 122 is also illustrated as including the CC output module 126, which as previously described is representative of functionality of the client 104 related to closed captions. For example, the CC output module 126 may be executed to locate and render analog closed captions 210 and/or digital closed captions 212 for output on a display device. For example, the CC output module 126 when executed may locate the analog closed captions 210 in the VBI and output them in conjunction with the content 114(*l*). In another example, the CC output module 126 may locate the stream of digital closed captions 212 and render them for output, such as by utilizing decryption and decompression techniques before rendering on a display device.

The CC output module 126 is also representative of functionality to output a user interface that is configured to accept inputs to set the preferences 130(*p*) used in processing the closed captions, e.g., the analog closed captions 210 and/or the digital closed captions 212. For example, the CC output module 126 may output a user interface that is configured to accept digital CC preferences 130(*l*), such as which of a plurality of digital closed captioning options are preferred. The CC output module 126 may also output a user interface that is configured to accept analog CC preference 130(2), such as which of a plurality of analog closed captioning options are preferred. Further discussion of user interfaces to set preferences may be found in relation to FIGS. 3-5.

The CC output module 126 and/or the CC manager module 128 may also be representative of functionality to switch between closed captions. For example, situations may be encountered in which a preferred closed caption is not available. Therefore, the CC output module 126 may be executed to switch to another closed caption for output. In this way, a user is not limited to a single choice of closed caption as was encountered using traditional techniques. Further discussion of closed caption switching may be found in relation to FIGS. 6 and 7.

Exemplary User Interfaces

Figure 3:
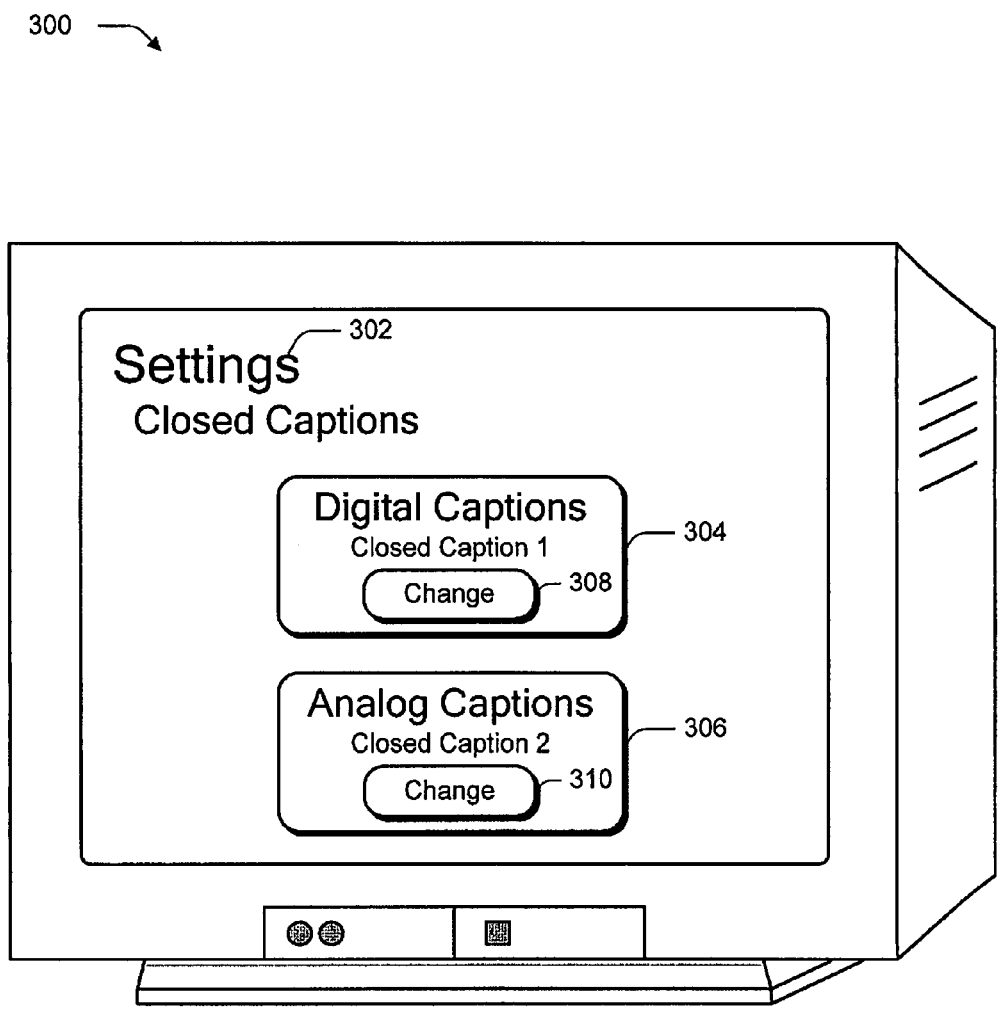
FIG. 3 is an illustration of an exemplary user interface as output on a display device that is configured to accept inputs regarding preferences of digital closed captions and analog closed captions.

FIG. 3 illustrated an exemplary user interface 300 as output on a display device that is configured to accept inputs regarding preferences of digital closed captions and analog closed captions. The user interface 300 is illustrated as a "settings" 302 page that includes options to set preferences for digital captions 304 and analog captions 306. Each of these options further includes respective selectable portions 308, 310 that, when selected, cause options to be displayed for input of preferences.

Figure 4:
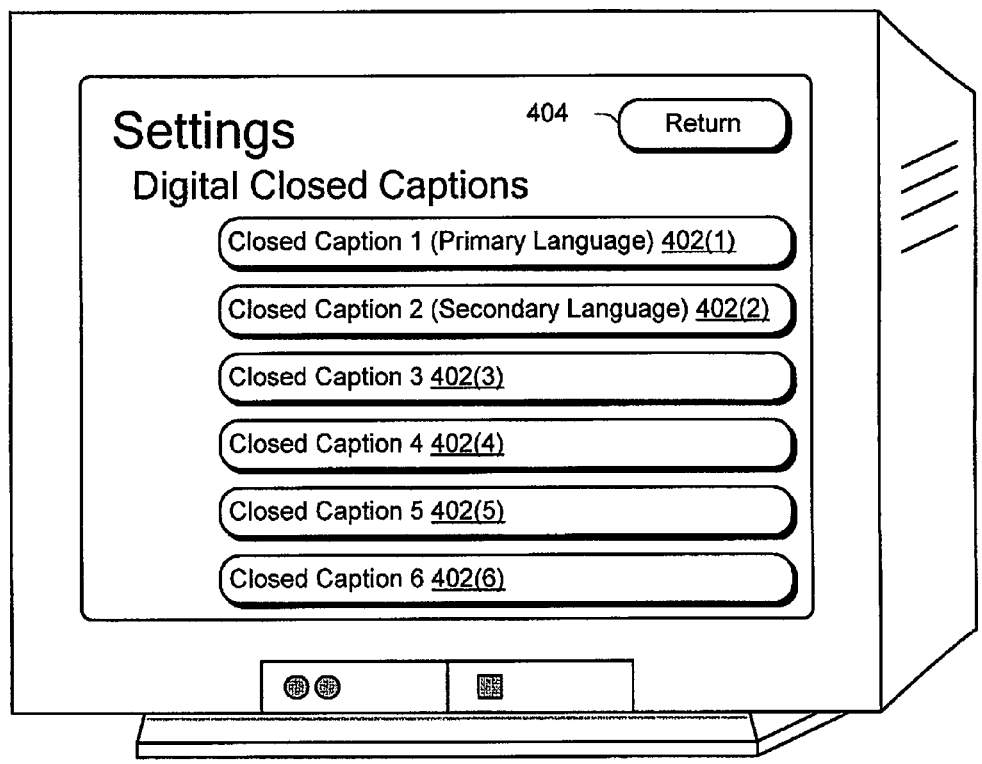
FIGS. 4 and 5 are illustrations an exemplary user interfaces as output on a display device in response to selection of respective selectable portions of the user interface of FIG. 3. The illustrated user interface of FIG. 4 is configured to accept inputs regarding preferences of digital closed captions. The illustrated user interface of FIG. 5 is configured to accept inputs regarding preferences of analog closed captions.
Figure 5:
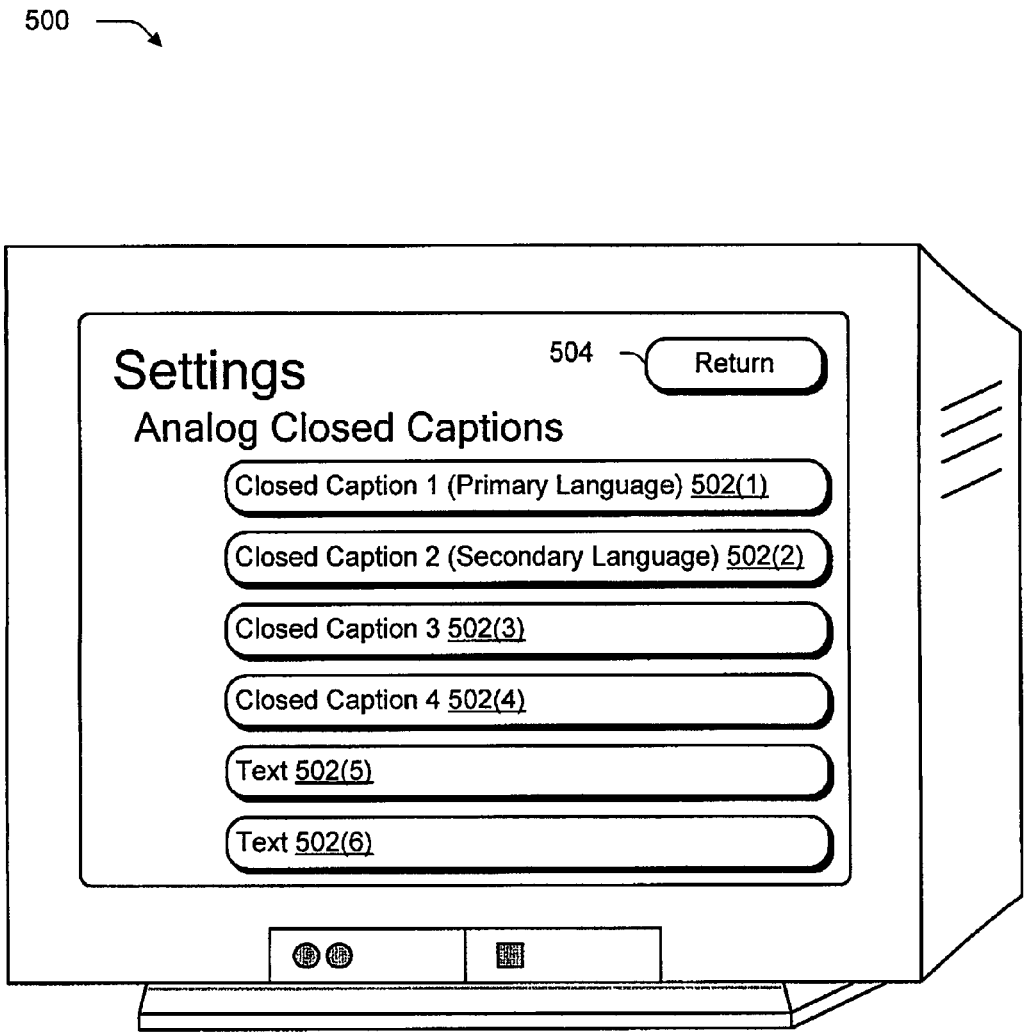

FIGS. 4 and 5 are illustrations of exemplary user interfaces 400, 500 as output on a display device in response to selection of a selectable portion of the user interface of FIG. 3. The illustrated user interface 400 of FIG. 4 is configured to accept inputs regarding preferences of digital closed captions. For example, the user interface 400 depicts a plurality of portions 402(1)-402(6) that are selectable (e.g., via remote control, cursor control device, or other input device) by a user to specify a preferred digital closed caption. Once selected, the user interface 400 may return to the user interface 300 of FIG. 3. If a selection is not made or is not desirable, the user may return to the user interface 300 of FIG. 3 by selecting a "return" button 404.

The illustrated user interface 500 of FIG. 5 is configured to accept inputs regarding preferences of analog closed captions. For example, the user interface 500 includes selectable portions depicted as "closed caption 1 (primary language)" 502(1), "closed caption 2 (secondary language)" 502(2), "closed caption 3" 502(3), "closed caption 4" 502(4), "text" 502(5) and "text" 502(6). As before, a user may then utilize an input device to select a preferred closed caption to be used for analog close captions and may select a "return" button 504 to return to the user interface 300 of FIG. 3.

Although these user interfaces 300-500 described selection of preferred streams, user interfaces may also be configured to specify a hierarchy (e.g., ranking) of closed captions. Therefore, when a preferred closed caption is not available the client 104 of FIG. 1 may switch to another closed caption, further discussion of which may be found in relation to the following procedures.

Generally, any of the functions described herein can be implemented using software, firmware, hardware (e.g., fixed-logic circuitry), manual processing, or a combination of these implementations. The terms "module", "functionality" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices. The features of the closed caption preference techniques described herein are platform-independent, meaning that the techniques may be implemented on a variety of commercial computing platforms having a variety of processors.

Exemplary Procedures

The following discussion describes closed caption preference techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1, the system 200 of FIG. 2 and the user interfaces 300-500 of FIGS. 3-5.

Figure 6:
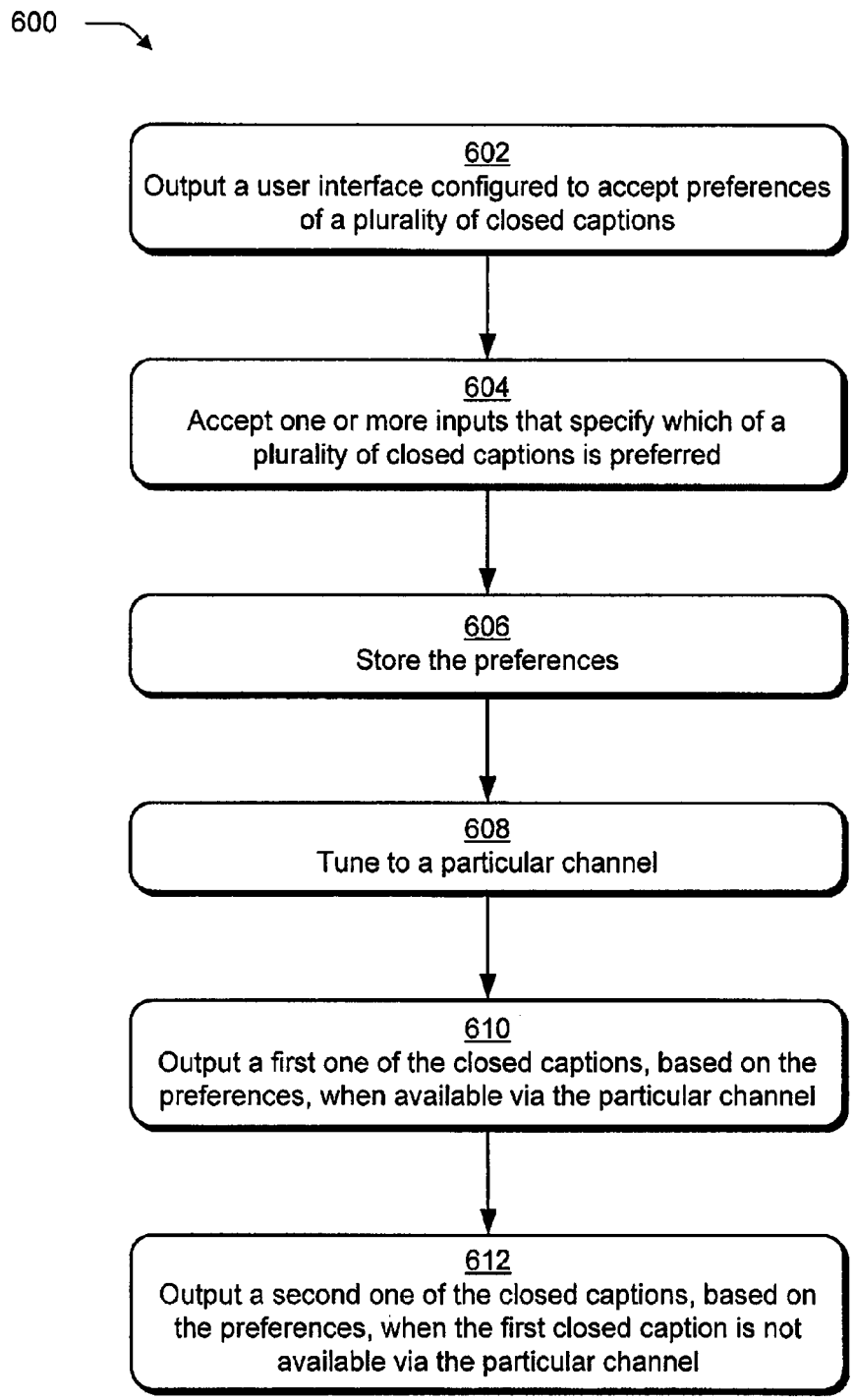
FIG. 6 is a flow diagram depicting a procedure in an exemplary implementation in which preferences are input via a user interface and used in determining which closed captions to output in conjunction with content.

FIG. 6 depicts a procedure 600 in an exemplary implementation in which preferences are input via a user interface and used in determining which closed captions to output in conjunction with content. A user interface is output that is configured to accept preferences of a plurality of closed captions (block 602). The user interface, for instance, may be output through execution of the CC output module 126 at the client 104, through execution of a CC manager module 128 through a web service that is accessed by the communication module 122 that employs browser functionality, and so on.

One or more inputs are accepted that specify which of a plurality of closed captions is preferred (block 604). For example, the user may interact with the user interface 400 of FIG. 4 to specify a particular one of the options for digital closed captions. The user may also interact with the user interface 500 of FIG. 5 to specify a particular one of the options for analog closed captions.

In another example, a user may specify a hierarchy, such as by ranking the closed caption options for the digital closed captions in the user interface 400 of FIG. 4. A variety of other examples are also contemplated. The preferences are then stored (block 606), such as at the client 104 and/or remotely at the head end 102 over the network connection 110.

A client is then tuned to a particular channel (block 608), such as by selection of a channel in an electronic program guide, using a "channel up" or "channel down" button, entering a channel number, and so on. A first one of the closed captions is output, based on the preferences, when available via the particular channel (block 610). The user, for instance, may have specified "closed caption 1 (primary language)" 402(1) as a preferred closed caption. Therefore, the CC output module 126 may determine whether that closed caption is available, such as by monitoring a particular stream, checking an Event Information Table (EIT) included in a transport stream of content, and so on. If the preferred closed caption is available, the CC output module 126 outputs it for rendering and display on a display device.

When the first closed caption is not available via the particular channel, a second one of the closed captions is output based on the preferences (block 612). For example, the "closed caption 1 (primary language)" 402(1) may not be available via a particular channel. Therefore, another closed caption may be output in its place. For instance, the preferences 130($p$) may define a hierarchy (e.g., ranking) of the closed captions 402(1)-402(6) that are digitally available. Therefore, when closed caption 402(1) is not available, the CC output module 126 may select another closed caption (e.g., "closed caption 2 (secondary language" 402(2)) based on the hierarchy. In this way, a user that wishes to interact with closed captions is still provided with a closed caption even when a preferred closed caption is not available. A variety of other examples are also contemplated, such as by "switching" from a digital closed caption that is not available to an analog closed caption, further discussion of which may be found in relation to the following figure.

Figure 7:
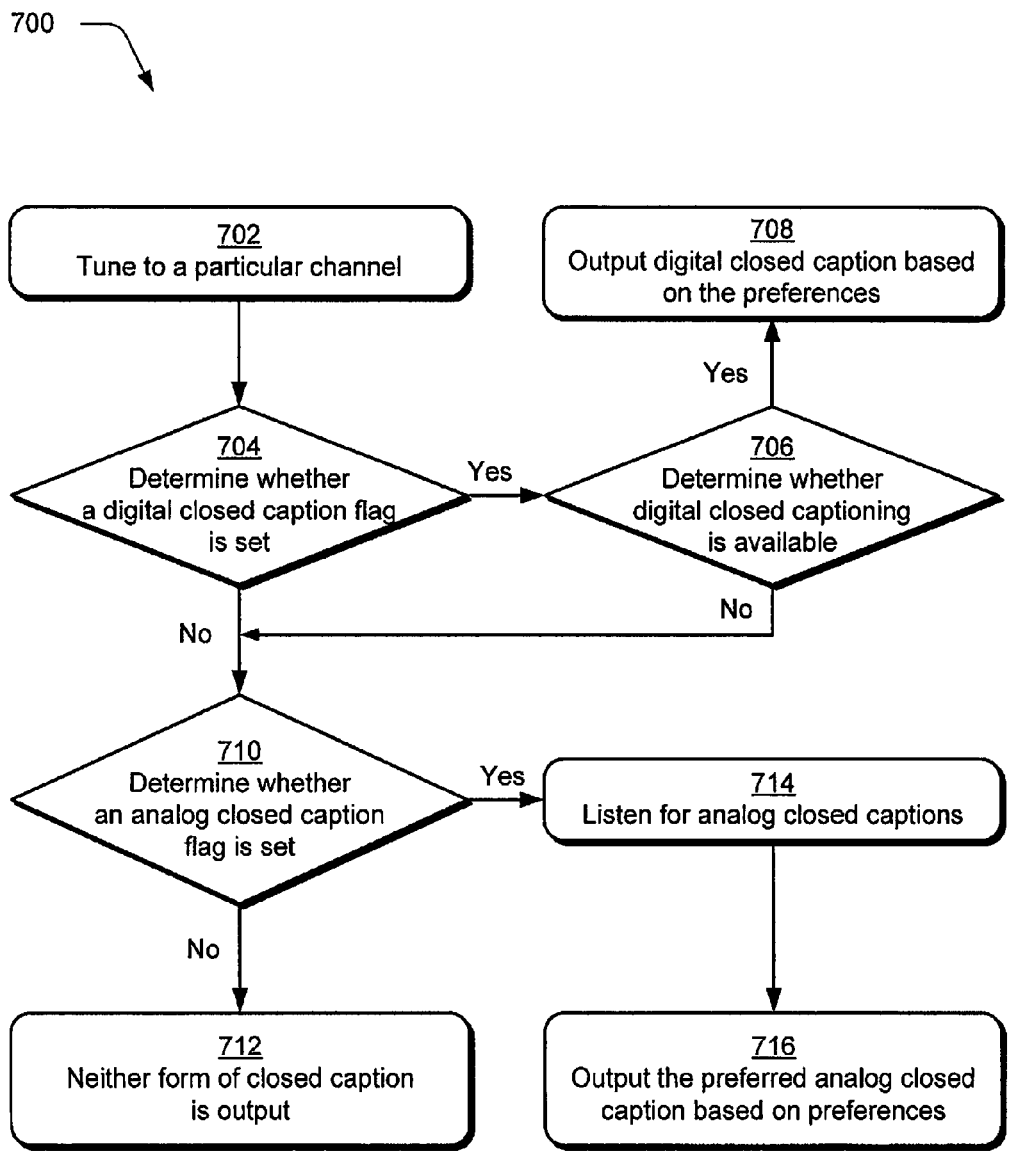
FIG. 7 is a flow diagram depicting a procedure in an exemplary implementation in which automatic switching is performed from a digital closed caption to an analog closed caption due to unavailability of the digital closed caption.

FIG. 7 depicts a procedure 700 in an exemplary implementation in which automatic switching is performed from a digital closed caption to an analog closed caption due to unavailability of the digital closed caption. A client is tuned to a particular channel (block 702). A determination is then made as to whether a digital closed caption flag is set (decision block 704). For example, the CC output module 126 may query the preferences 130($p$) to determine whether output of a digital closed caption is desired.

When the digital closed caption flag is set ("yes" from decision block 704), a determination is made as to whether digital closed captioning is available (decision block 706). For example, the CC output module 126 may check an Event Information Table included in a transport stream used to stream the content 114($l$) to determine whether a stream of digital closed captions 212 are available for that channel. If so ("yes" from decision block 706) the digital closed caption is output based on the preferences (block 708).

If digital closed captioning is not available ("no" from decision block 706), a determination is made as to whether an analog closed caption flag is set (decision block 710). As before, the CC output module 126 may query the preferences 130(p) to determine if the user specified a desired to output analog closed captions should the digital closed captions be unavailable (decision block 706) or desired (decision block 704). If the analog closed caption flag is not set ("no" from decision block 710), neither form of closed caption is output (block 712).

When the analog closed caption flag is set ("yes" from decision block 710), the CC output module 126 is set to listen for analog closed captions (block 714). The CC output module 126, for instance, may listen for analog closed captions 210 included in a VBI of the content 114(l). The preferred analog closed caption is then output based on preferences (block 716). Thus, in this example digital closed captions are output if available, and if not, closed captions are output based on preferences that may be specified using the user interfaces 300-500 of FIGS. 3-5. A variety of other examples are also contemplated, such as output of a digital closed caption when another digital closed caption is not available.

A variety of other implementations are also contemplated. For example, a user may specify a digital closed caption service (e.g., "set a flag" as shown in block 704 of FIG. 7) but not an analog caption service (e.g., does not set a flag as shown in block 710 of FIG. 7). In such a case, the client 104 may still listen for a digital closed caption service and output if present. For instance, this may be done because it is possible for a stream to contain digital closed captions even though their presence is not "properly" signaled, e.g., does not comply with applicable standards. A variety of other implementations are also contemplated.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method comprising:
   outputting a user interface configured to accept a ranking of a plurality of digital closed captions for output and a ranking of a plurality of analog closed captions for output such that:
   the ranking of the plurality of digital closed captions ranks at least a first said digital closed caption and a second said digital closed caption and indicates that the first said digital closed caption is preferred to the second said digital closed caption, the second said digital closed caption is not to be output when the first said digital closed caption is available; and
   the ranking of the plurality of analog closed captions ranks at least a first said analog closed caption and a second said analog closed caption and indicates that the first said analog closed caption is preferred to the second said analog closed caption, the second said analog closed caption is not to be output when the first said analog closed caption is available;
   outputting a first said closed caption, based on the ranking of the plurality of digital closed captions or the ranking of the plurality of analog closed captions, when available via a particular channel; and
   outputting a second said closed caption, based on the ranking of the plurality of digital closed captions or the ranking of the plurality of analog closed captions, when the first said closed caption is not available and the second said closed caption is available via the particular channel.

2. A method as described in claim 1, wherein:
   the first said closed caption is digital; and
   the second said closed caption is analog.

3. A method as described in claim 2, wherein:
   the first said closed caption is configured according to Electronic Industries Alliance 708 (EIA-708) standard for closed captioning; and
   the second said closed caption is configured according to Electronic Industries Alliance 608 (EIA-608) standard for closed captioning.

4. A method as described in claim 1, wherein:
   the first said closed caption is configured to be streamed separately than a stream used to communicate content via the particular channel; and
   the second said closed caption is configured to be streamed with the stream used to communicate content via the particular channel.

5. A method as described in claim 1, wherein:
   the first said closed caption is not configured to be communicated via a video blanking interval in content available via the particular channel; and
   the second said closed caption is configured to be communicated via the video blanking interval in the content available via the particular channel.

6. A method as described in claim 1, wherein the user interface is configured to accept preferences that rank a plurality of said closed captions.

7. A method as described in claim 1, further comprising determining if the first said closed caption is available via the particular channel.

8. A method as described in claim 7, wherein the determining is performed by checking an event information table (EIT) or a program map table (PMT) included in content streamed via the particular channel.

9. A method as described in claim 1, wherein the particular channel is configured to communicate content that includes television programming and video on demand.

10. A client comprising:
    a processor; and
    memory configured to maintain a module that is executable on the processor to automatically switch without user intervention from a preferred closed caption to another closed caption when the preferred closed caption is not available, wherein the automatic switching to the other closed caption is based on at least one of a ranking of a plurality of digital closed captions for output or a ranking of a plurality of analog closed captions for output that are specified by a user, the ranking of the plurality of digital closed captions indicating that a first said digital closed caption is to be output ahead of a second said digital closed caption that is ranked behind the first said digital closed caption when both the first said digital closed caption and the second said digital closed caption are available, and the ranking of the plurality of analog closed captions indicating that a first said analog closed caption is to be output ahead of a second said analog closed caption that is ranked behind the first said analog closed caption when both the first said analog closed caption and the second said analog closed caption are available.

11. A client as described in claim 10, wherein the preferred closed caption and the other closed caption correspond to digital video recorder content stored in the memory.

12. A client as described in claim 10, wherein:
the preferred closed caption is made available via a separate stream from content that corresponds to the preferred closed caption; and
the other closed caption is included within a video blanking interval of the content.

13. A client as described in claim 10, wherein the module is executable to automatically switch without user intervention when the preferred closed caption is not available when tuning to a channel.

14. A client as described in claim 10, wherein the preferred closed caption and the other closed caption are arranged in a hierarchy of a plurality of said closed captions, at least two of which having respective priorities that are assigned by a user.

15. One or more computer-readable memory devices comprising executable instructions that are executable to output a user interface configured to receive inputs that specify preferences for digital and analog closed captions to be displayed with content, the preferences including a ranking of a plurality of said digital closed captions and a ranking of a plurality of said analog closed captions for output in order of availability, the ranking of the plurality of digital closed captions indicating that a first said digital closed caption is to be output ahead of a second said digital closed caption that is ranked behind the first said digital closed caption when both the first said digital closed caption and the second said digital closed caption are available for output, and the ranking of the plurality of analog closed captions indicating that a first said analog closed caption is to be output ahead of a second said analog closed caption that is ranked behind the first said analog closed caption when both the first said analog closed caption and the second said analog closed caption are available for output.

16. One or more computer-readable memory devices as described in claim 15, wherein the preferences specify:
one of the plurality of said digital closed captions are to be output; and
one of the plurality of said analog closed captions are to be output when the one said digital closed caption is not available.

17. One or more computer-readable memory devices as described in claim 15, wherein:
the digital closed captions are configured according to Electronic Industries Alliance 708 (EIA-708) standard for closed captioning; and
the analog closed captions are configured according to Electronic Industries Alliance 608 (EIA-608) standard for closed captioning.

18. One or more computer-readable memory devices as described in claim 15, wherein the analog closed captions are configured to be communicated in a video blanking interval (VBI) and the digital closed captions are not.

* * * * *